US012579292B2

(12) United States Patent
Zykh et al.

(10) Patent No.: US 12,579,292 B2
(45) Date of Patent: Mar. 17, 2026

(54) SYSTEMS AND METHODS FOR SECURING A DATA STREAM WITH ATTRIBUTE-BASED ACCESS CONTROL

(71) Applicant: The Toronto-Dominion Bank, Toronto (CA)

(72) Inventors: Igor Zykh, Voorhees, NJ (US); Wei Zhou, Markham (CA); Nikita Fodtchouk, Etobicoke (CA); Chuang Yang Schlueter, Toronto (CA); Julia Wan-Man Lok, St. Thomas (CA); Adam Cowin, Kingston (CA)

(73) Assignee: The Toronto-Dominion Bank, Toronto (CA)

( * ) Notice: Subject to any disclaimer, the term of this patent is extended or adjusted under 35 U.S.C. 154(b) by 141 days.

(21) Appl. No.: 18/386,150

(22) Filed: Nov. 1, 2023

(65) Prior Publication Data

US 2025/0139267 A1     May 1, 2025

(51) Int. Cl.
*G06F 21/30*        (2013.01)
*G06F 21/60*        (2013.01)
*G06F 21/62*        (2013.01)

(52) U.S. Cl.
CPC ........ *G06F 21/6218* (2013.01); *G06F 21/602* (2013.01); *G06F 21/604* (2013.01)

(58) Field of Classification Search
CPC ... G06F 21/6218; G06F 21/602; G06F 21/604
USPC .......................................................... 726/27
See application file for complete search history.

(56) References Cited

U.S. PATENT DOCUMENTS

| | | | | |
|---|---|---|---|---|
| 6,643,650 B1 | 11/2003 | Slaughter | | |
| 7,246,104 B2 * | 7/2007 | Stickler | ................ | G06F 16/951 |
| 7,284,062 B2 | 10/2007 | Krantz | | |
| 8,634,796 B2 * | 1/2014 | Johnson | ................ | H04W 4/029 |
| | | | | 455/566 |
| 9,015,301 B2 * | 4/2015 | Redlich | ............... | G06F 16/2465 |
| | | | | 707/777 |
| 9,191,209 B2 | 11/2015 | Erickson | | |
| 9,619,669 B2 * | 4/2017 | LaFever | ............. | G06F 21/6254 |
| 9,973,455 B1 | 5/2018 | Fowler | | |
| 10,348,693 B2 | 7/2019 | Auradkar | | |
| 11,698,990 B2 * | 7/2023 | McFall | ................. | H04L 9/0866 |
| | | | | 726/26 |
| 11,727,012 B2 * | 8/2023 | Singh | ................ | G06F 16/24568 |
| | | | | 707/769 |

(Continued)

*Primary Examiner* — Tauqir Hussain
(74) *Attorney, Agent, or Firm* — NIXON PEABODY LLP

(57)        ABSTRACT

Systems and methods for data streaming with attribute-based access control. A client apparatus in a data streaming system receives a message via a data stream. The message has a schema version of the schema associated therewith. The client apparatus processes the message to retrieve a record, the record including a data item and a data tag corresponding to the data item. The client apparatus, with reference to the schema version, determine whether an identifier of the client apparatus has permission to access the data item associated with the data tag. After detecting that the identifier does not have permission, the client apparatus masks the data item to produce a masked data record and releases the masked data record for further processing by the client apparatus. A monitoring apparatus of the system uses a machine learning model, such as a neural network, to identify a category for a data tag.

20 Claims, 7 Drawing Sheets

(56) References Cited

U.S. PATENT DOCUMENTS

| | | | | |
|---|---|---|---|---|
| 12,015,684 | B2 * | 6/2024 | Cosentino | G06F 9/541 |
| 12,164,542 | B1 | 12/2024 | Rahman | |
| 12,298,949 | B2 | 5/2025 | Arora | |
| 2019/0286828 | A1 * | 9/2019 | Anderson | G06F 21/62 |
| 2020/0145384 | A1 * | 5/2020 | Chauhan | H04W 12/69 |
| 2022/0374296 | A1 * | 11/2022 | Antinori | G06F 9/546 |
| 2023/0128136 | A1 | 4/2023 | Sahu | |
| 2023/0130670 | A1 | 4/2023 | Gogerty | |
| 2023/0139783 | A1 * | 5/2023 | Garib | G06N 3/044 |
| | | | | 707/769 |
| 2023/0198960 | A1 * | 6/2023 | Vadlamani | H04L 63/0428 |
| | | | | 726/26 |
| 2024/0205284 | A1 * | 6/2024 | Wu | H04L 65/70 |
| 2024/0330279 | A1 * | 10/2024 | Truong | G06F 16/2428 |
| 2025/0028852 | A1 | 1/2025 | Chowanski | |
| 2025/0030547 | A1 | 1/2025 | Chowanski | |
| 2025/0045316 | A1 * | 2/2025 | Lee | G06F 16/3344 |
| 2025/0068646 | A1 | 2/2025 | Rahman | |
| 2025/0077939 | A1 | 3/2025 | Tabatabaei | |
| 2025/0103752 | A1 * | 3/2025 | Vuppalapati | G06F 21/6254 |
| 2025/0104700 | A1 | 3/2025 | Henault-Ethier | |
| 2025/0238410 | A1 | 7/2025 | Arora | |

* cited by examiner

EXAMPLE

302 ∿ SCHEMA USED BY TOPIC: TOPIC A
304 ∿ SCHEMA ID: 10088
306 ∿ SCHEMA VERSION: VERSION 3 (CURRENT)

▽ CLIENTS
308 — CLIENT ID SPACE: CLIENTIDSPACE_3
310 ▽ ATTRIBUTE FIELDS
  ▽ 1
312 — NAME: USERID
314 — TYPE: STRING
  ▽ 2
  -NAME: REGIONID
  -TYPE: STRING
  ▽ 3 [ PII ✕ ]  — 320
316 — NAME: GENDER
318 — TYPE: STRING

SCHEMA DESCRIPTION: — 322
USER REGION +
GENDER

TAGS: — 324
( MACHINE_LEARNING
 TAGS_APP        ✕ )  — 326

DATE CREATED:
DATE XYZ

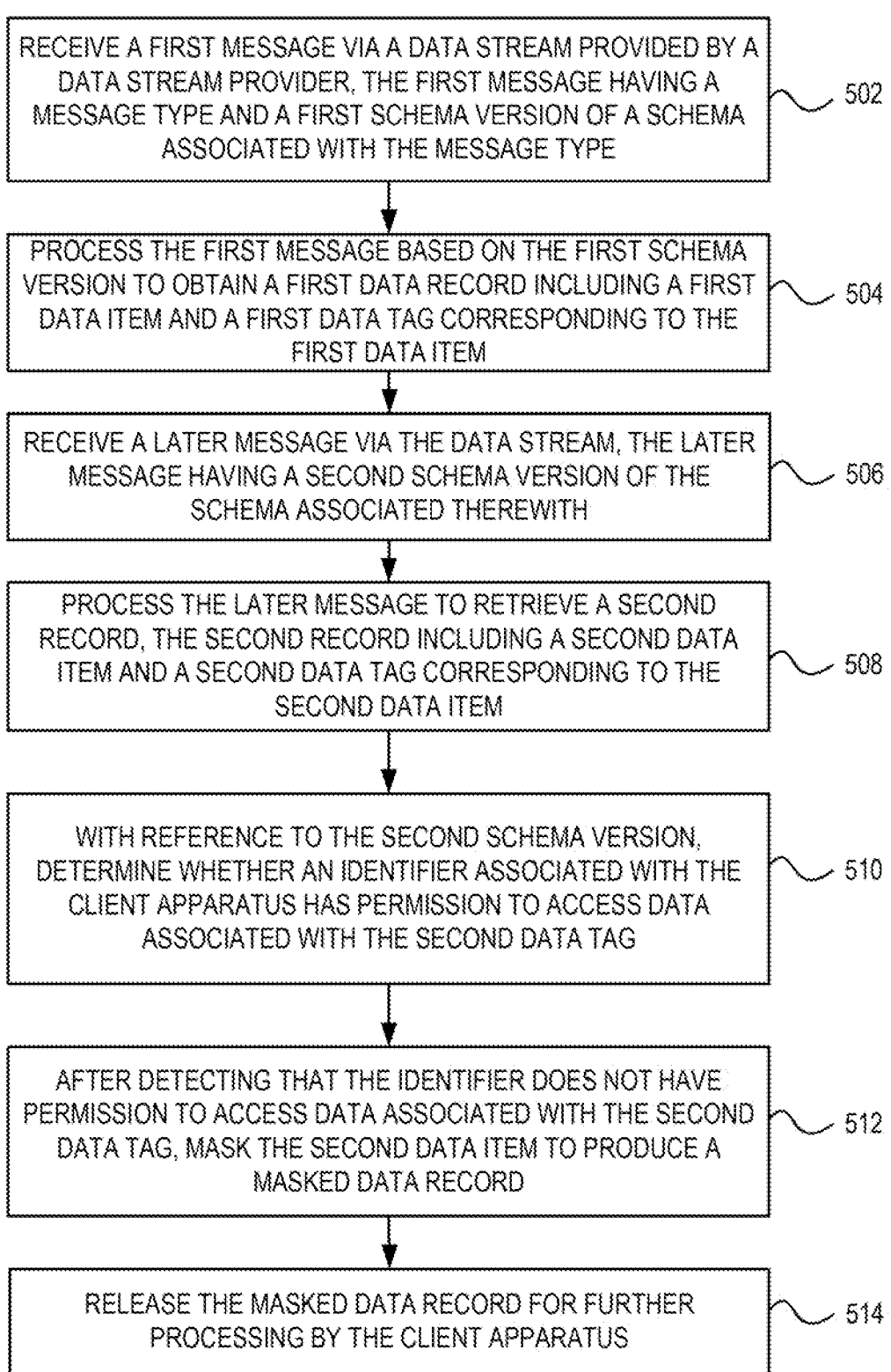

RECEIVE A FIRST MESSAGE VIA A DATA STREAM PROVIDED BY A DATA STREAM PROVIDER, THE FIRST MESSAGE HAVING A MESSAGE TYPE AND A FIRST SCHEMA VERSION OF A SCHEMA ASSOCIATED WITH THE MESSAGE TYPE — 502

PROCESS THE FIRST MESSAGE BASED ON THE FIRST SCHEMA VERSION TO OBTAIN A FIRST DATA RECORD INCLUDING A FIRST DATA ITEM AND A FIRST DATA TAG CORRESPONDING TO THE FIRST DATA ITEM — 504

RECEIVE A LATER MESSAGE VIA THE DATA STREAM, THE LATER MESSAGE HAVING A SECOND SCHEMA VERSION OF THE SCHEMA ASSOCIATED THEREWITH — 506

PROCESS THE LATER MESSAGE TO RETRIEVE A SECOND RECORD, THE SECOND RECORD INCLUDING A SECOND DATA ITEM AND A SECOND DATA TAG CORRESPONDING TO THE SECOND DATA ITEM — 508

WITH REFERENCE TO THE SECOND SCHEMA VERSION, DETERMINE WHETHER AN IDENTIFIER ASSOCIATED WITH THE CLIENT APPARATUS HAS PERMISSION TO ACCESS DATA ASSOCIATED WITH THE SECOND DATA TAG — 510

AFTER DETECTING THAT THE IDENTIFIER DOES NOT HAVE PERMISSION TO ACCESS DATA ASSOCIATED WITH THE SECOND DATA TAG, MASK THE SECOND DATA ITEM TO PRODUCE A MASKED DATA RECORD — 512

RELEASE THE MASKED DATA RECORD FOR FURTHER PROCESSING BY THE CLIENT APPARATUS — 514

FIG. 5

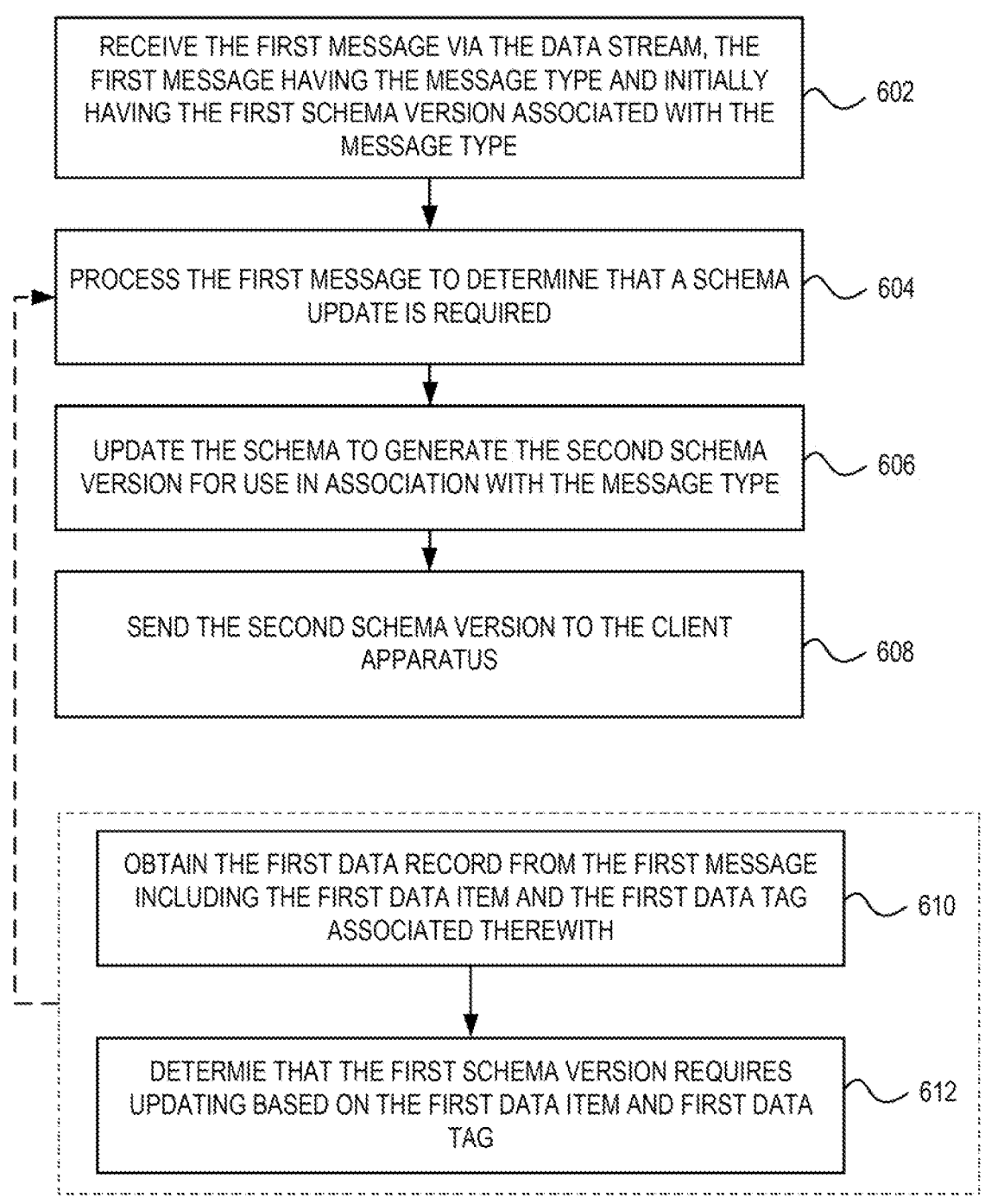

RECEIVE THE FIRST MESSAGE VIA THE DATA STREAM, THE FIRST MESSAGE HAVING THE MESSAGE TYPE AND INITIALLY HAVING THE FIRST SCHEMA VERSION ASSOCIATED WITH THE MESSAGE TYPE — 602

PROCESS THE FIRST MESSAGE TO DETERMINE THAT A SCHEMA UPDATE IS REQUIRED — 604

UPDATE THE SCHEMA TO GENERATE THE SECOND SCHEMA VERSION FOR USE IN ASSOCIATION WITH THE MESSAGE TYPE — 606

SEND THE SECOND SCHEMA VERSION TO THE CLIENT APPARATUS — 608

OBTAIN THE FIRST DATA RECORD FROM THE FIRST MESSAGE INCLUDING THE FIRST DATA ITEM AND THE FIRST DATA TAG ASSOCIATED THEREWITH — 610

DETERMIE THAT THE FIRST SCHEMA VERSION REQUIRES UPDATING BASED ON THE FIRST DATA ITEM AND FIRST DATA TAG — 612

FIG. 6

SYSTEMS AND METHODS FOR SECURING A DATA STREAM WITH ATTRIBUTE-BASED ACCESS CONTROL

TECHNICAL FIELD

The disclosed exemplary embodiments relate to computer-implemented systems and methods for securing a data stream with attribute-based access control.

BACKGROUND

The increasing adoption of messaging and data streaming platforms has brought forth new computing challenges in ensuring robust data security and data access controls.

In some cases, it is difficult to provide access control for data streaming platforms. The entire content of data payloads being streamed is typically viewable by a subscriber who receives the data payload via the data stream. Existing methodologies for securing large heterogeneous data platforms often fall short in providing fine-grained control and proactive protection for sensitive data. Furthermore, many existing attempts to filter data require manual intervention or complicated encryption schemes. Existing solutions are not conducive to being scaled for large and continuous data streaming, nor do they provide data security and data control access in near real time.

For example, if a payload of data is published to a client system, especially in a data streaming pipeline, a party that can access the data pipeline can see the entire payload of data (i.e., all the content parts that are within the payload of data). To avoid this, it may be necessary to encrypt payloads with different encryption keys, and manage those encryption keys. This can quickly become unwieldy as the number of clients with different access privileges increases.

Additionally, in some cases, the lack of intelligent classification and tagging mechanisms makes it difficult to enforce effective access policies based on specific attributes. This results in ineffective human driven processes and increases the risk of unauthorized access or data breaches.

Furthermore, it may be difficult to align access control mechanisms with evolving compliance and security requirements. The absence of a dynamic and flexible access management framework poses challenges in granting fine grain access while maintaining data integrity and privacy.

SUMMARY

The following summary is intended to introduce the reader to various aspects of the detailed description, but not to define or delimit any invention.

In at least one broad aspect, there is a data streaming system with attribute-based access control. The system comprises a client apparatus, which comprises: a client memory; a client communication interface; and a client processor operatively coupled to the client memory and the client communication interface. The client processor is configured to: receive a first message via a data stream provided by a data stream provider, the first message having a message type and a first schema version of a schema associated with the message type; process the first message based on the first schema version to obtain a first data record including a first data item and a first data tag corresponding to the first data item; receive a later message via the data stream, the later message having a second schema version of the schema associated therewith; process the later message to retrieve a second record, the second record including a second data item and a second data tag corresponding to the second data item; with reference to the second schema version, determine whether an identifier associated with the client apparatus has permission to access the second data item associated with the second data tag; after detecting that the identifier does not have permission to access data associated with the second data tag, mask the second data item to produce a masked data record; and release the masked data record for further processing by the client apparatus.

In some cases, following receipt of the later message, the client processor is further configured to obtain the second schema version of the schema.

In some cases, the system further comprises a monitoring apparatus, which comprises: a monitoring apparatus memory; a monitoring apparatus communication interface; and a monitoring apparatus processor coupled to the monitoring apparatus memory and the monitoring apparatus communication interface. The monitoring apparatus processor is configured to: receive the first message via the data stream, the first message having the message type and initially having the first schema version associated with the message type; process the first message to determine that a schema update is required; update the schema to generate the second schema version for use in association with the message type; and send the second schema version to the client apparatus.

In some cases, the processing of the first message by the monitoring apparatus processor comprises: obtaining the first data record from the first message including the first data item and the first data tag associated therewith; and determining that the first schema version requires updating based on the first data item and first data tag.

In some cases, the determining comprises processing the data item using a category tagging machine learning model.

In some cases, the category tagging machine learning model is a categorization model.

In some cases, the first message and the later message are encrypted, and wherein the client apparatus decrypts the first message and the later message prior to processing the first message and the later message.

In some cases, the first message and the later message are serialized, and wherein the client apparatus deserializes the first message and the later message prior to processing the first message and the later message.

In some cases, the client apparatus is a subscriber to a first topic, and the data stream is specific to the first topic.

In some cases, after releasing the masked data, the client apparatus processor configured to further: obtain a third schema version that replaces the second schema version, wherein the third schema version is associated with the identifier of the client apparatus and wherein the third schema version comprises an access permission associated with the second data tag; receive a subsequent message via the data stream, which is after the later message, wherein the subsequent message is associated with the third schema version; process the subsequent message to retrieve a third record, the third record including a third data item and a second data tag corresponding to the third data item; with reference to the third schema version, detect the access permission associated with the second data tag; and release the third data record for further processing by the client apparatus.

In at least another broad aspect, a method for data streaming with attribute-based access control is provided, the method executed in a computing environment comprising one or more processors and memory, and the method comprising: a client apparatus receiving a first message via a data stream provided by a data stream provider, the first message having a message type and a first schema version of a schema associated with the message type; the client apparatus processing the first message based on the first schema version to obtain a first data record including a first data item and a first data tag corresponding to the first data item; the client apparatus receiving a later message via the data stream, the later message having a second schema version of the schema associated therewith; the client apparatus processing the later message to retrieve a second record, the second record including a second data item and a second data tag corresponding to the second data item; with reference to the second schema version, the client apparatus determining whether an identifier associated with the client apparatus has permission to access data associated with the second data tag; after detecting that the identifier does not have permission to access data associated with the second data tag, the client apparatus masking the second data item to produce a masked data record; and the client apparatus releasing the masked data record for further processing by the client apparatus.

In some cases, the method further comprising: following receipt of the later message, the client apparatus retrieving the second schema version of the schema.

In some cases, the method further comprising: a monitoring apparatus receiving the first message via the data stream, the first message having the message type and initially having the first schema version associated with the message type; the monitoring apparatus processing the first message to determine that a schema update is required; the monitoring apparatus updating the schema to generate the second schema version for use in association with the message type; and the monitoring apparatus sending the second schema version to the client apparatus.

In some cases, the processing of the first message by the monitoring apparatus comprises: obtaining the first data record from the first message including the first data item and the first data tag associated therewith; and determining that the first schema version requires updating based on the first data item and first data tag.

In some cases, the determining comprises processing the data item using a category tagging machine learning model.

In some cases, the category tagging machine learning model is a categorization model.

In some cases, the first message and the later message are encrypted, and wherein the client apparatus decrypts the first message and the later message prior to processing the first message and the later message.

In some cases, the first message and the later message are serialized, and wherein the client apparatus deserializes the first message and the later message prior to processing the first message and the later message.

In some cases, after releasing the masked data, the method further comprises: the client apparatus receiving a third schema version that replaces the second schema version, wherein the third schema version is associated with the identifier of the client apparatus and wherein the third schema version comprises an access permission associated with the second data tag; the client apparatus receiving a subsequent message via the data stream, which is after the later message, wherein the subsequent message is associated with the third schema version; the client apparatus processing the subsequent message to retrieve a third record, the third record including a third data item and a second data tag corresponding to the third data item; with reference to the third schema version, the client apparatus detecting the access permission associated with the second data tag; and the client apparatus releasing the third data record for further processing by the client apparatus.

In at least another broad aspect, a method for data streaming with attribute-based access control is provided, the method executed in a computing environment comprising one or more processors and memory. The method comprises a client apparatus in a data streaming system receives a message via a data stream from a data stream provider. The message has a schema version of the schema associated therewith. The client apparatus processes the message to retrieve a record, the record including a data item and a data tag corresponding to the data item. The client apparatus, with reference to the schema version, determine whether an identifier (e.g., client ID) of with the client apparatus has permission to access the data item associated with the data tag. After detecting that the identifier does not have permission to access data associated with the data tag, the client apparatus masks the data item to produce a masked data record. The client apparatus releases the masked data record for further processing by the client apparatus.

According to some aspects, the present disclosure provides a non-transitory computer-readable medium storing computer-executable instructions. The computer-executable instructions, when executed, configure a processor to perform any of the methods described herein.

BRIEF DESCRIPTION OF THE DRAWINGS

The drawings included herewith are for illustrating various examples of articles, methods, and systems of the present specification and are not intended to limit the scope of what is taught in any way. In the drawings:

FIG. 5 is a flowchart diagram of an example method of computing attribute-based access control executed by the client apparatus, in accordance with at least some embodiments; and FIG. 6 is a flowchart diagram of an example method of computing attribute-based access control executed by the monitoring apparatus, in accordance with at least some embodiments.

DETAILED DESCRIPTION

Figure 1:
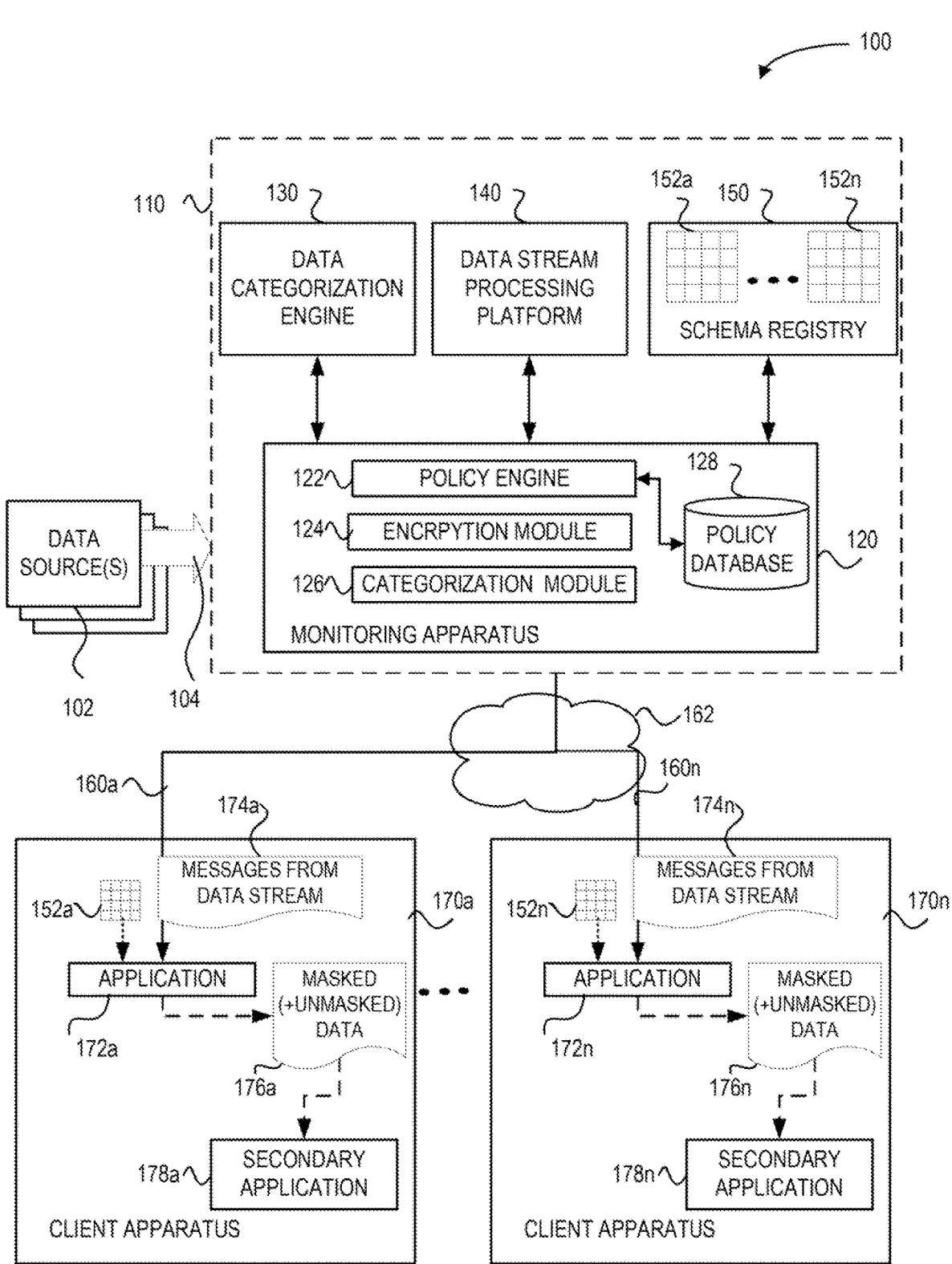
FIG. 1 is a schematic block diagram of a system for a data streaming system with attribute-based access control in accordance with at least some embodiments.

In some cases, a data streaming system with attributed-based access control (ABAC) is provided. A client apparatus has access to streamed data based on an identifier (also herein called a client ID). In some cases, the identifier or client ID is associated with a user account that is accessed via the client apparatus, rather than the client apparatus itself. A schema identifies which tagged information may be revealed based on the identifier of the client apparatus. As and when the schema is updated, the identifier may be provided with access or may be denied access to information. A monitoring apparatus monitors the data stream to identify restricted information in data messages, or restricted information that violates a current schema version (e.g., because the tag is not rated to contain restricted information), and updates the schema accordingly when it detects restricted information.

In some cases, the data streaming system improves security of real-time data streaming platforms by combining machine learning based data classification tagging with ABAC.

In some cases, the data streaming system uses classification computations to create and/or assign data tags that is based on artificial intelligence (AI) computations or machine learning (ML) computations. In some cases, the data streaming system automatically applies the data tags to data items in the data stream in real-time or near real-time to automatically categorize messages in the data stream. In some cases, the categorization takes into account attributes of the data, including, but not limited to content of the data and context of the data (e.g., who is providing the data, what is the source of the data, etc.).

A schema is applied to the messages with the data tags (also herein referred to as labelled messages). The schema can have multiple versions and is used to control the access to the labeled messages. The schema may also be herein referred to as an "access schema". In some cases, the schema may be considered a mask that allows a certain client apparatus (e.g., subscribing client system, a computing device that operates an application with a subscribing user account, etc.) to only view certain labeled data that is authorized for viewing/access according to the credentials associated with identifier of the client apparatus.

This enables the data streaming system to automatically enforce precise access controls and prevent unauthorized entities from interacting with critical data resources.

In some cases, the schema is locally enforced on the client apparatus by a trusted client application (or trusted library) that is provisioned with an encryption key to decrypt the data stream. The classified and labeled messages are streamed (including to the client apparatus) in an encrypted manner that requires the encryption key to access.

Based on the schema and its version, the trusted client application determines, locally on the client apparatus, if a given message (which is encrypted and labeled) can be accessed by a downstream application (e.g., a secondary application) on the client apparatus by determining if a data item in a message matches one more data tags in the schema version. If the client apparatus has permission, in some cases that client apparatus unmasks the data item in the message so that the downstream application can access and/or display the data item.

Through such implementation of attribute-based access control, in some cases, a dynamic and flexible access data framework can be built on top of an open policy framework. The data streaming system can be configured to define access policies based on different types of attributes, including user roles, data sensitivity, and custom-defined attributes. This granular control allows for autonomous precise permission management, enabling organizations to mitigate risks and safeguard their messaging and data streaming platforms.

More generally, the data streaming system provides messaging and data streaming platforms users with computational tools and capabilities to improve the security of their data ecosystems. In some cases, AI-based classification tagging and automated attribute-based access control are used and are configured to provide near real-time capabilities. In some cases, the data streaming system uses the schema and a data categorization engine to automatically identify high risk and highly sensitive data, and records it as fact.

In some cases, the data stream(s) sent to one or more client apparatuses is asynchronous. In other words, the data is not sent as a data batch.

In some cases, a data categorization engine tags the data, such as personal identifiable information (PII). A monitoring apparatus, in communication with the data categorization engine and a schema registry, reads in a schema from the schema registry. The schema specifies an identifier associated the client apparatus. In some cases, the schema identifies restricted content and accessible content, and masks the data that is restricted. For example, the masked data can be displayed as "**********". It will be appreciated that other visual symbols, characters and graphics can be used to display the masked data. The masked data does not show the actual data, but one or more masking visual elements in place of the actual data being masked.

In some cases, all data is restricted by default to a client apparatus and so all data is masked by default. However, a given client apparatus associated with a given identifier can be provisioned with access in an updated version of the schema, such that certain data items with certain data tags are authorized to be viewed by the given client apparatus having the given identifier.

In some cases, the categorizations and the data tags are not stored in the messages, but instead the categorizations and the data tags are stored in the schema registry.

In some case, a data stream processing platform serializes and sends the data stream to a client apparatus subscribing to the data stream processing platform. In some cases, to deserialize the messages in the data stream, the client apparatus uses the schema to understand the attributes of the data. In some cases, the client apparatus de-serializes the messages without initially or natively processing any data tags. The client apparatus uses a schema to identify the attributes of the data items, and adds one or more data tags according to the schema.

Referring now to FIG. 1, a data streaming system 100 with attribute-based access control is shown. The data streaming system 100 includes a data stream provider 110 that ingests a data stream 104 from one or more data sources 102. In some cases, the data stream 104 from the one or more data sources 102 is unprotected (e.g., not encrypted).

The data stream provider 110 processes the data stream 104 from the one or more data sources 102 and transmits a data stream 160a specific to a client apparatus 170a. In some cases, the data stream provider 110 serves multiple client apparatuses. For example, the data stream provider 110 processes the data stream 104 from the one or more data sources 102 and transmits another data stream 160n specific to another client apparatus 170n. It will be appreciated that the data streams 160a, 160n that are specific to the client apparatuses 170a, 170n are derived from or directly obtained from the data stream 104 from the one or more data sources 102. In some cases, the data streams 160a, 160n include encrypted data messages that are sent to the client apparatuses 170a, 170n. The data streams 160a, 160n are transmitted from the data stream provider 110 over a data network 162 to the respective client apparatuses 170a, 170n. In some cases, the data network 162 is a wired data network. In some other cases, the data network 162 includes wireless networking.

The data stream provider 110 includes a monitoring apparatus 120, a data categorization engine 130, a data stream processing platform 140, and a schema registry 150.

The monitoring apparatus 120 is coupled to, or is in data communication with, or both, the data categorization engine 130, the data stream processing platform 140, and the schema registry 150. In some cases, the monitoring apparatus 120, the data categorization engine 130, the data stream processing platform 140 and the schema registry 150 reside on separate computing apparatuses (e.g., physical computing servers or virtual machines). In some other cases, the monitoring apparatus 120, the data categorization engine 130, the data stream processing platform 140 and the schema registry 150 reside on a same computing apparatus (e.g., a physical computer server or a virtual machine).

In some cases, the monitoring apparatus 120 includes: a policy engine 122 that accesses a policy database 128, an encryption module 124, and a categorization module 126.

In some cases, the policy engine 122 is used to execute policies for data masking and unmasking. The conditions for masking and unmasking, for example are stored in the policy database 128. In some cases, the policy engine 122 is used to interact with the schema registry 150 to create, read, update, and delete one or more schemas 152a, 152n, which control the masking and unmasking of certain data items.

In some cases, the schema registry 150 provides a centralized repository for managing and validating one or more schemas 152a, 152n for topic message data, and for serialization and deserialization of the data over the network. Producers (e.g., one or more data sources 102) and consumers (e.g., one or more client apparatuses 170a, 170n) to a given topic can use schemas 152a, 152n to ensure data consistency and compatibility as schemas evolve. For example, a given schema 152a can be revised by the monitoring apparatus 120 to generate subsequent versions of itself.

The encryption module 124 is used to encrypt data messages from the data stream 104 originating from the one or more data sources 102. The encrypted data messages are filtered, for example, using the data stream processing platform 140, to generate the data stream 160a specific to the client apparatus 170a.

In some cases, the client apparatus 170a is a subscriber to a given Topic A, and the data stream processing platform 140 generates a data stream 160a of encrypted data messages that are associated with Topic A, and sends the data stream 160a to the client apparatus 170a.

In some cases, the data stream processing platform 140 is a distributed data store that ingests and processes data streams in real-time. In some cases, the data stream 104 from the one or more data sources 102 is ingested by the data stream processing platform 140, and the data stream processing platform 140 processes the data stream 104 in real-time. In some cases, there are multiple data streams from multiple data sources, which are simultaneously ingested by the data stream processing platform 140. In some cases, the data stream processing platform 140 is implemented using a platform known by the trade name Kafka™ provided by The Apache Software Foundation. In some other cases, a different type of data stream processing platform is used.

The categorization module 126 is used to apply data tags to data messages. In some cases, apply a data tag to a data item associated with or derived from a given data message. In some cases, the data tags are categorization tags, specifying a category to which a given data item is associated.

In some cases, the data categorization engine 130 applies automatically determines a category of a given data item, and automatically applies a given data tag associated with the category to the given data item. For example, the data categorization engine 130 identifies that a given data item includes a person's name, and the data categorization engine 130 categorizes this type of data (e.g., name data) with a data tag indicating PII.

In some cases, the data categorization engine 130 includes and executes a category tagging machine learning model in order to determine a category and, accordingly, a data tag to be associated with a data item. In some cases, the category machine learning model is a classification model. In still some cases, the category machine learning model is an artificial intelligence module that includes a neural network that is trained to identify one or more categories, and therefore one or more respective data tags, to be associated with a given data item.

In some cases, each client apparatus is associated with an identifier (also called a client ID). A given schema is associated with one or more identifiers. In some cases, the schema 152a is associated with the client apparatus 170a, whereby the client apparatus is associated with its own identifier. Similarly, a different schema 152n is associated with the client apparatus 170n, whereby the client apparatus 170n is associated with its own identifier separate from the identifier of the client apparatus 170a.

In some other cases (not shown in FIG. 1), the schema 152a is associated with a set of identifiers corresponding to the client apparatuses 170a and 170n. In other words, the client apparatuses 170a and 170n both use the same schema 152a.

In some other cases, a plurality of different schemas is associated with an identifier (e.g., client ID) of a client apparatus.

As per FIG. 1, an instance of the schema 152a is locally stored in memory on the client apparatus 170a, and similarly an instance of the schema 152n is locally stored on the client apparatus 170n.

The instances of the schemas 152a, 152n that are respectively locally stored on the client apparatuses 170a, 170n are obtained from the schema registry 150, or from the monitoring apparatus 120.

In the case of the client apparatus 170a, it receives a data stream 160a from the data stream provider 110. The data stream 160a includes a series of messages 174a.

An application 172a on the client apparatus 170a processes each of the series of messages using the schema 152a to produce masked data and/or unmasked data 176a. In some cases, only masked data is produced based on a given message from amongst the series of messages 174a. In some other cases, only unmasked data is produced based on the given message. In some other cases, both masked data and unmasked data are produced from the given message. For example, a first given data item derived or obtained from the given message is unmasked, and a second given data item derived or obtained from the same given message is masked.

The masked and/or unmasked data 176a is released or provided to a secondary application 178a, which, in some cases, also resides and operates on the same client apparatus 170a. In some other cases, the secondary application 178a resides and operates on an external computing device (not shown).

In some cases, by locally processing the messages from the data stream 160a on the client apparatus 170a, the computational operations and resources are decentralized to an edge-processing computing architecture. In other words, the masking and unmasking process does not occur centrally by the monitoring apparatus. This decentralized and edge-processing computing architecture allows for scalability. At the same time, the configuration and control of the attributes that are masked is centralized and deployed to the one or more client apparatuses in a scalable manner. In other words, the controls of masking and unmasking may be updated dynamically in an automatic manner or manually by an administrative user, or both, depending on various conditions, including, in some cases, the category of a data item in a given message and the client ID (e.g., the identifier associated with a client apparatus).

Similar operations and data components occur, for example, in the client apparatus 170n, including a series of messages 174n from the data stream 160n, an application 172n, unmasked and/or masked data 176n, and a secondary application 178n.

Figure 2:
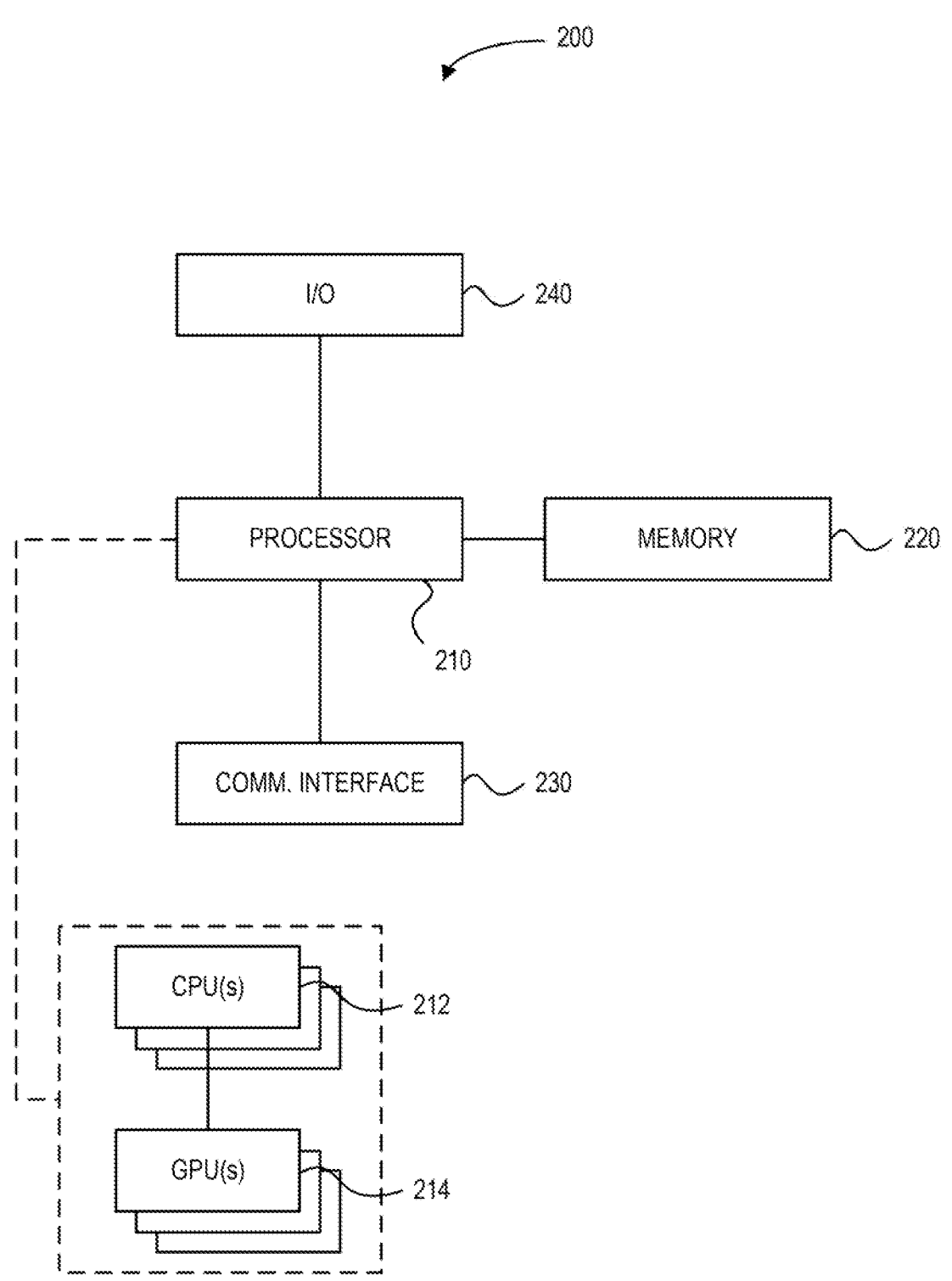
FIG. 2 is a block diagram of a computer in accordance with at least some embodiments.

Referring now to FIG. 2, there is illustrated a simplified block diagram of a computer in accordance with at least some embodiments. Computer 200 is an example implementation of a computer such as the monitoring apparatus 120, the client apparatus 170, the data categorization engine 130, the data stream processing platform 140, and the schema registry 150 shown in FIG. 1. Computer 200 has at least one processor 210 operatively coupled to at least one memory 220, at least one communications interface 230 (also herein called a network interface), and at least one input/output device 240. For a client apparatus 170, examples of input/output devices include a display screen, a pointer selection controller (e.g., a mouse or a touch screen, or both), and a keyboard (e.g., a physical keyboard or a touch screen that includes digital keyboard functionality, or both).

The at least one memory 220 includes a volatile memory that stores instructions executed or executable by processor 210, and input and output data used or generated during execution of the instructions. Memory 220 may also include non-volatile memory used to store input and/or output data—e.g., within a database—along with program code containing executable instructions.

Processor 210 may transmit or receive data via communications interface 230, and may also transmit or receive data via any additional input/output device 240 as appropriate.

In some cases, the processor 210 includes a system of central processing units (CPUs) 212. In some other cases, the processor includes a system of one or more CPUs and one or more Graphical Processing Units (GPUs) 214 that are coupled together. For example, the data categorization engine 130 executes machine learning computations on CPU and GPU hardware, such as the system of CPUs 212 and GPUs 214.

Figure 3:
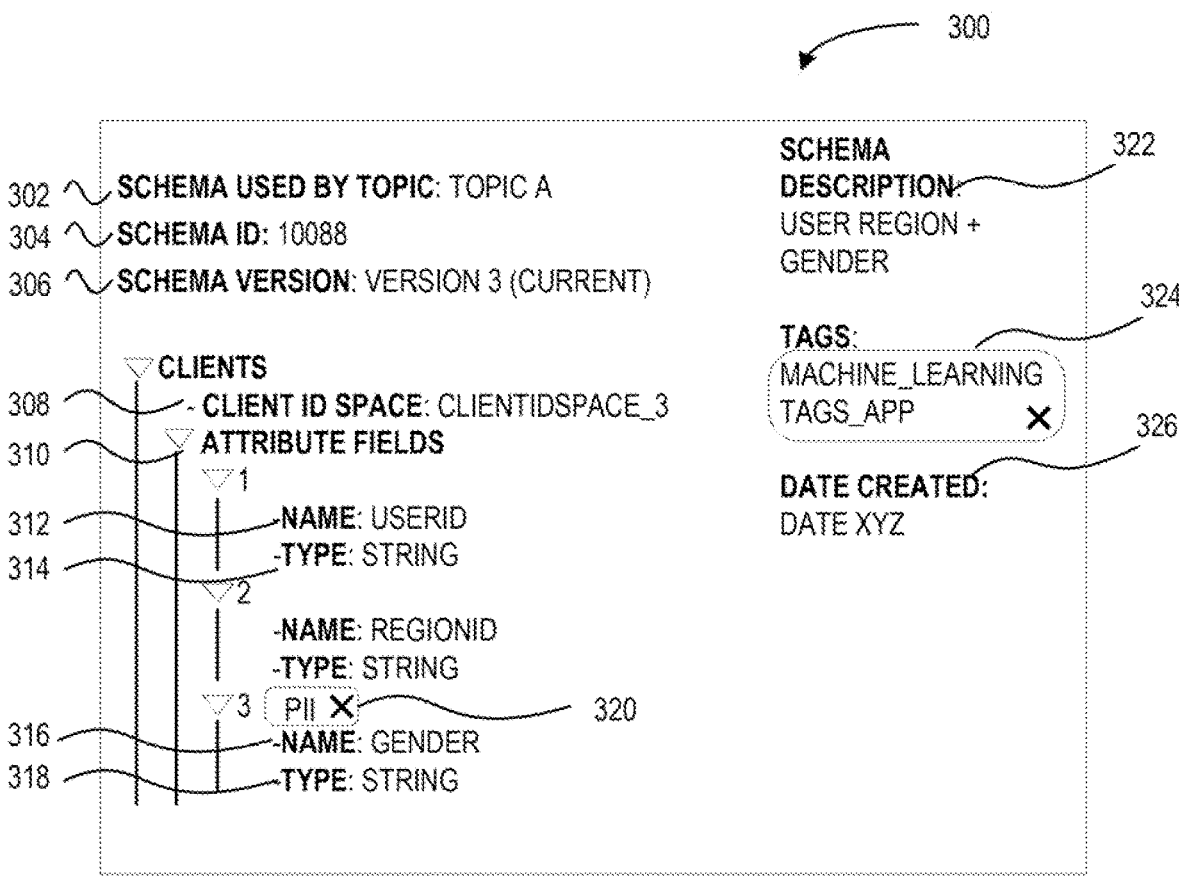
FIG. 3 is a graphical user interface presentation of a schema in accordance with at least some embodiments.

Referring now to FIG. 3, an example graphical user interface (GUI) of a schema 300 is presented. In some embodiments, the GUI of the schema 300 includes: a topic 302 that is associated with the schema; a schema ID 304; a schema version identifier 306; a client ID identifier 308; one or more attribute fields 310; a schema description 322; one or more tags 324, 320; and a date of creation 326.

In some cases, a client apparatus with a given identifier is a subscriber of the topic 302 identified in the schema.

In some cases, the schema version identifier 306 indicates that the current version is version 3, and there are previous versions (e.g., version 1 and version 2) of the same schema. In some cases, version 3 is different from the previous versions, for example, by having a different tag, a different client ID identifier, a different set of attributes, etc. It will be appreciated that the schema versions can be updated automatically or manually. The current schema version (e.g., version 3) is actively used by a client apparatus associated with an identifier that matches or falls within the client ID identifier 308.

In some cases, the client ID identifier 308 identifies a set or space of a plurality of client IDs. For example, a group of individual client IDs may be collectively identified by a group client ID, and each individual client ID is associated with a corresponding client apparatus. In some other cases, the client ID identifier 308 identifies one identifier associated with a client apparatus.

In the example shown in FIG. 3, one of the attribute fields includes an attribute name 312 (e.g., user ID) and a related data type 314 (e.g., string). Another one of the attribute fields includes an attribute name 316 (e.g., gender) and a related data type (e.g., string) 318. A data tag 320, in this case identifying a PII category, is associated with the attribute name 316 related to gender. Another one of the attribute fields includes an attribute name (e.g., geographical region ID) and a related data type (e.g., string).

In some cases, a message type of a given message is identified by the combination of attribute fields in a message. In some other cases, a message type of a given message is identified by another feature of the given message, and this feature used to identify the message type is part of the schema. For example, in some cases, the message type is identified by a topic of which a client apparatus is a subscriber.

Figure 4A:
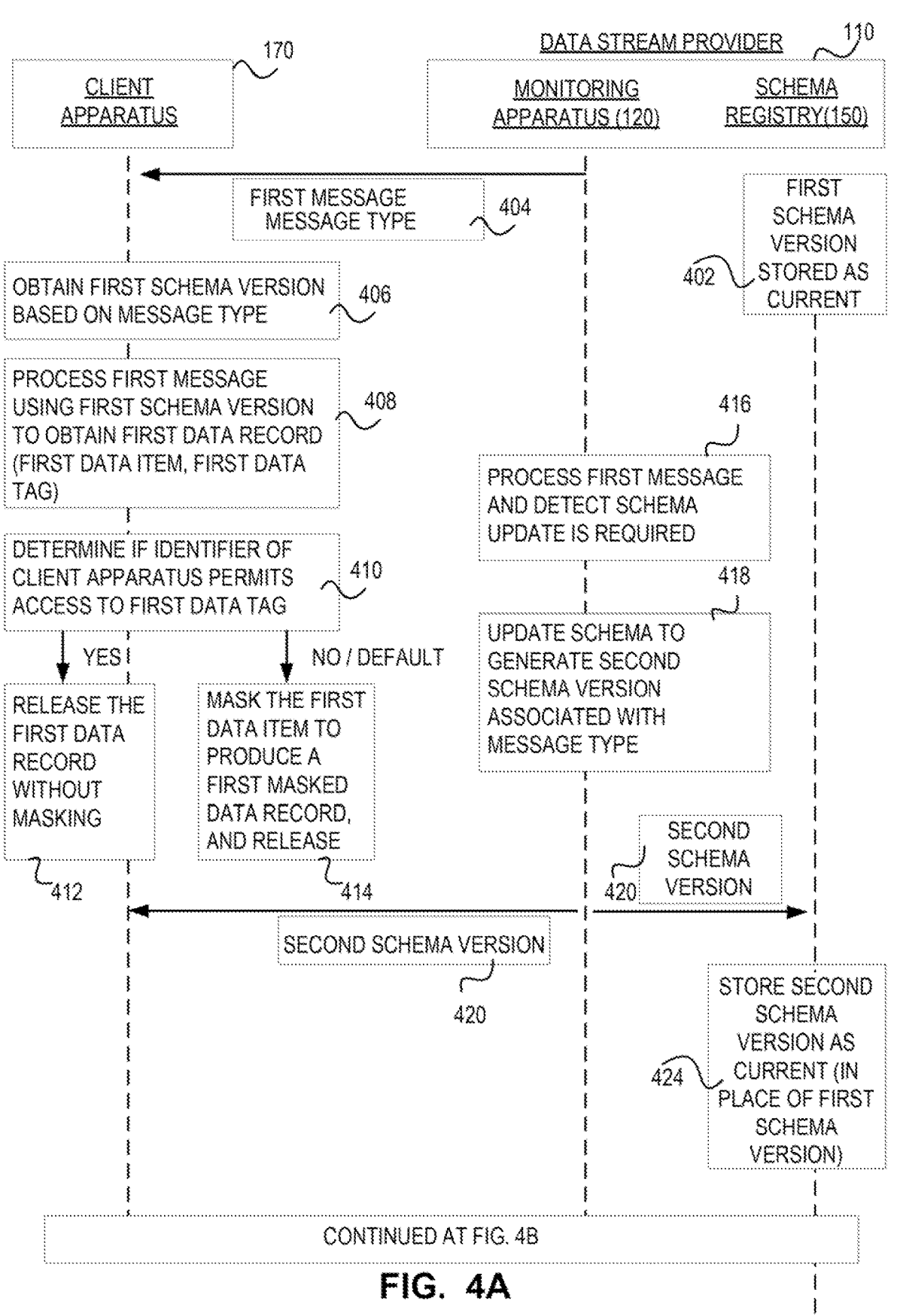
FIGS. 4A and 4B provide a flowchart diagram of an example method of computing attribute-based access control, including showing the interaction between a client apparatus and a monitoring apparatus, in accordance with at least some embodiments.

Referring now to FIG. 4A, in some example embodiments, a first schema version of a schema is stored as the current version in the schema repository 150, as per operation 402. A data stream provider 110 sends a first message 404, having a message type, to a client apparatus 170. The client apparatus 170 obtains a first schema version based on the message type (operation 406).

In some cases, the first schema version also includes a client identifier that matches or includes an identifier of the client apparatus 170. In other words, the first schema version is applicable to the client apparatus and to the first message.

The client apparatus 170 processes the first message using the first schema version to obtain a first data record (operation 408). The first data record includes a first data item and first data tag. In some cases, the first data item and the first data tag are identifiable in the first schema version, which outlines the attributes of the data in the first message.

The client apparatus 170 also determines if the identifier of the client apparatus permits access to the first data tag (operation 410).

If so, the first data record is released (for example, to the secondary application 178) without masking (operation 412). More particularly, the first data item is not masked.

If access is not permitted, then the client apparatus 170 masks the first data item to produce a first masked data record (operation 414). This first masked data record, which includes the masked first data item, is released, for example, to the secondary application 178.

In some cases, messages are by default not permitted to be accessed by the client apparatus, and, therefore, all the data items in the messages are masked when released to other applications (e.g., the secondary application 178). Accordingly, in these cases, data items must have data tags, which are associated with unmasking, in order to be released without masking. In other words, the unmasked data is viewable by a secondary application 178.

In the example embodiment of FIG. 4A, the monitoring apparatus 120 processes the first message and detects that a schema update is required (operation 416). There may be different conditions that could apply, which when detected, trigger the schema update.

For example, the monitoring apparatus 120 detects the message type of the first message has changed from a previous message type. This could then trigger the schema update.

In another example, the monitoring apparatus 120 detects a given data item (which could be the first data item or another data item) in the first message is a new attribute that is not defined in the first schema version. This could then trigger the schema update. In this example, in some cases that the given data item is considered a new attribute, or does not match a known attribute in the first schema version, then the client apparatus by default masks the given data item.

In another example, the monitoring apparatus 120 detects a new data tag associated with a given data item (which could be the first data item or another data item). This could then trigger the schema update. In some cases, the new data tag is automatically generated and applied by the data categorization engine 130. In some cases, the new data tag is manually generated and applied by an administrative user of the monitoring apparatus.

In another example, the monitoring apparatus 120 detects a change of access permission associated with the first data tag. This could then trigger the schema update.

It will be appreciated there may be various conditions for triggering a schema update.

At operation 418, the monitoring apparatus updates the schema to generate a second schema version associated with the message type. The second schema version replaces the first schema version as the current version. Accordingly, the second schema version 420 is made available to the client apparatus 170 and to the schema registry 150. The schema registry stores the second schema version as the current version, in place of the first schema version (operation 424).

The second schema version is different from the first schema version.

Continuing the example in FIG. 4B, at a later time, the data stream provider 110 sends a later message 426 with the message type to the client apparatus 170 as part of a data stream 160.

At operation 428, the client apparatus 170 obtains the second schema version based on the message type of the later message.

At operation 430, the client apparatus 170 processes the later message using the second schema version to obtain a second data record. This second data record includes a second data item and a second data tag. The second data tag is defined in the second schema version, and in this example, is different from the first data tag.

At operation 430, the client apparatus 170 determines if the identifier of the client apparatus permits access to the second data tag.

If yes, then the client apparatus releases the second data record without masking (operation 434).

If access is not permitted to the client apparatus with the identifier, then the client apparatus masks the second data item to produce a masked data record (operation 436). This masked data record is released for another application (e.g., the secondary application) to use.

Figure 4B:
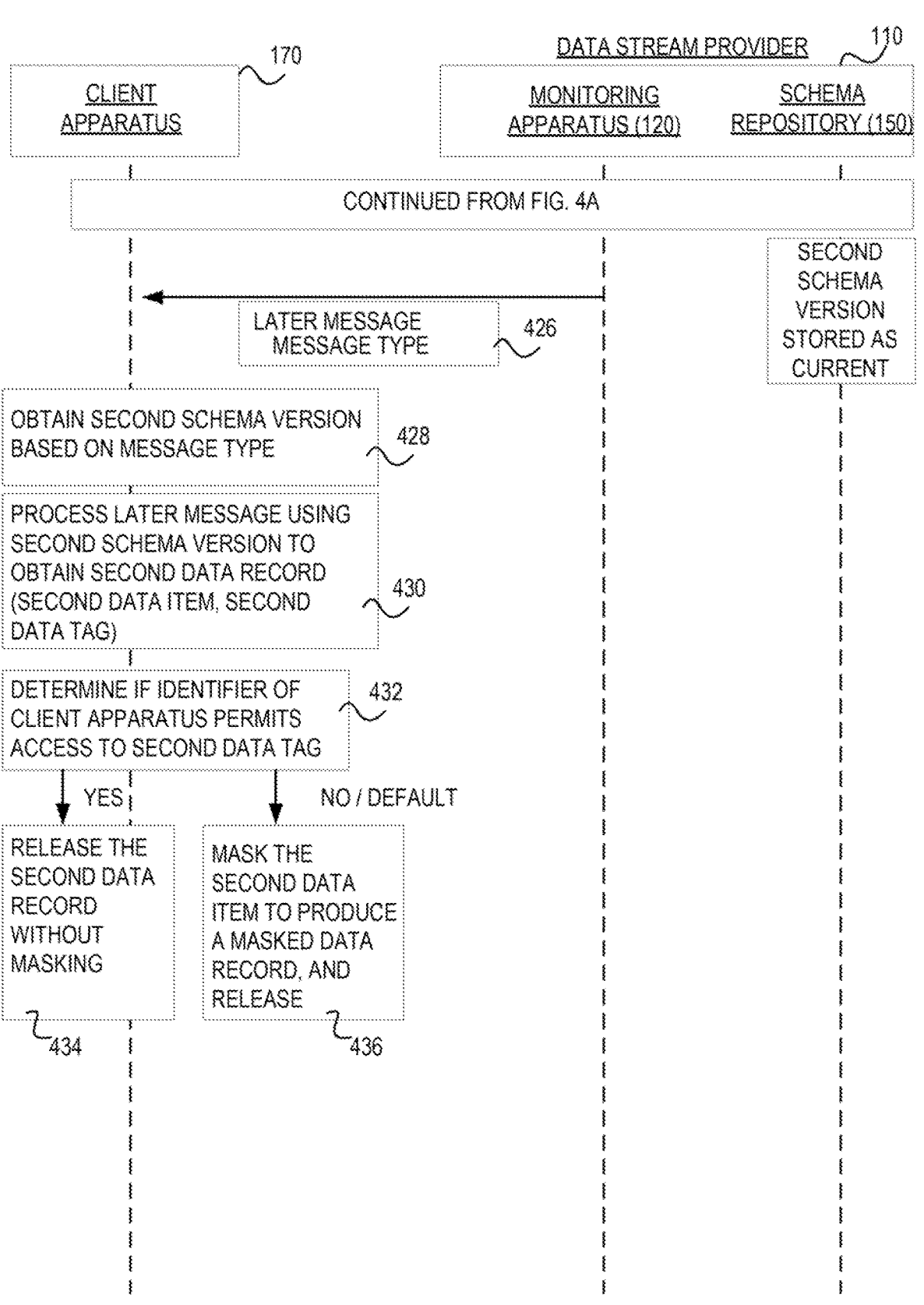

The process shown in FIG. 4B can be repeated for subsequent messages in the data stream 160 to permit access to data items with the second data tag. The data streaming system 100 is dynamic and allows for control of certain data to be masked or unmasked.

In some embodiments, the client apparatus 170 obtains a third schema version that replaces the second schema version, wherein the third schema version is associated with the identifier of the client apparatus and wherein the third schema version comprises an access permission associated with the second data tag. The client apparatus receives a subsequent message via the data stream, which is after the later message, wherein the subsequent message is associated with the third schema version. The client apparatus processes the subsequent message to retrieve a third record, the third record including a third data item and a second data tag corresponding to the third data item. With reference to the third schema version, the client apparatus detects the access permission associated with the second data tag, and then releases the third data record for further processing by the client apparatus. In particular, the third data record is not masked and the third data item is viewable and usable (without masking) by another application (e.g., a secondary application).

Referring now to FIG. 5, an example method is provided for attribute-based control of data in a data stream. In an example aspect, the operations described in the blocks in the flow diagram are executable instructions that are executed by the one or more processors of a client apparatus 170.

Block 502: The client apparatus receives a first message via a data stream provided by a data stream provider, the first message having a message type and a first schema version of a schema associated with the message type.

Block 504: The client apparatus processes the first message based on the first schema version to obtain a first data record including a first data item and a first data tag corresponding to the first data item.

Block 506: The client apparatus receives a later message via the data stream, the later message having a second schema version of the schema associated therewith.

Block 508: The client apparatus processes the later message to retrieve a second record, the second record including a second data item and a second data tag corresponding to the second data item.

Block 510: With reference to the second schema version, the client apparatus determines whether an identifier associated with the client apparatus has permission to access data associated with the second data tag.

Block 512: after detecting that the identifier does not have permission to access data associated with the second data tag, the client apparatus masks the second data item to produce a masked data record.

Block 514: The client apparatus releases the masked data record for further processing by the client apparatus.

Referring now to FIG. 6, an example method is provided for automatically updating a schema version for use in attribute-based control of data in a data stream. In an example aspect, the operations described in the blocks in the flow diagram are executable instructions that are executed by the one or more processors of a monitoring apparatus 120.

Block 602: A monitoring apparatus receives the first message via the data stream, the first message having the message type and initially having the first schema version associated with the message type.

Block 604: The monitoring apparatus processes the first message to determine that a schema update is required.

Block 606: The monitoring apparatus updates the schema to generate the second schema version for use in association with the message type.

Block 608: The monitoring apparatus sends the second schema version to the client apparatus.

In some case the processing operation at block 604 includes operations in blocks 610 and 612.

Block 610: The monitoring apparatus obtains the first data record from the first message including the first data item and the first data tag associated therewith.

Block 612: The monitoring apparatus determines that the first schema version requires updating based on the first data item and first data tag.

EXAMPLE

An example embodiment is provided. A message is streamed into the data stream provider 110, which in some cases is considered a centralized publisher.

The data stream provider 110 generates a new data record of the message that contains various types of PII, like name, social insurance number, Know Your Client (KYC) information, etc.

The data stream provider 110 sends the new data record to the data stream processing platform 140 in an encrypted and serialized format.

The new data record will be stored in the data stream processing platform for period of time (e.g., 30 days, or some other time period).

The data stream provider 110 registers a schema for the new data record in a schema registry.

The data categorization engine 130 obtains the new data record, decrypts it, and deserializes it.

The data categorization engine 130 then processes the data record to determine if it contains restricted content such as PII. If restricted content is found, the data categorization engine searches the schema registry for data tags associated with such restricted content. If appropriate data tags are not found, the data categorization engine updates the schema, to create a new version of the schema, with the appropriate data tags and then applies the data tags to the restricted content (e.g., at a granular level).

If the restricted content is not found, the schema registry may also be updated to include categories and/or data tags corresponding to the restricted content.

Continuing with the example, a client apparatus 170, which is subscribing to the data stream for specific information, has generic access to the data stream.

The client apparatus 170 pulls the new data record from the data stream and decrypts and deserializes it.

The client apparatus 170 applies attribute-based access control, which locally checks for data tags in the schema registry (which it may have local access to). It compares the tagged information against the identifier (e.g., the client ID). The client apparatus masks any data that the client ID does not have access to. Or, in other words, the client apparatus masks everything by default and only unmasks data that is tagged and which the schema has verified/cleared for viewing and display at the client device/system by the specific client ID.

In a further aspect of the example, in some cases, the client apparatus subscribes to a topic A, and so it receives all data from the data stream related to topic A. It downloads, decrypts and deserializes the data. However, as per the schema for the identifier associated with the client apparatus, the client apparatus is only authorized to see data item X but not data item Y. Therefore, the client apparatus masks the contents of data item Y (e.g., *******) and displays/reveals the contents of data item X on the feed that is displayed at the client apparatus.

Continuing with the example, the schema version can be updated to account for new information.

In the example, the data categorization engine detects a new information type associated with a data item, classifies the data item and assigns a new data tag to the same. It updates the schema registry if needed to identify the new information type, and the associated new data tag, thereby creating a new schema version.

Continuing with the example, this new information (which has a new information type) is sent to the client apparatus, but the client apparatus cannot access it until its identifier is provisioned with access to the new information type in the newly current version of the schema. For example, since the access permissions are for an older version of the schema, it cannot access data until new permissions are granted in the new version of the schema, and the newer version of the schema is provided to the client apparatus. Accordingly, the new information—and all information with the new data tags—is masked by the client apparatus as per the schema until such time as the newer version of the schema is provided to the client apparatus, whereby the newer version of the schema includes the new data tag that is associated with access permission for the identifier of the client apparatus.

Various systems or processes have been described to provide examples of embodiments of the claimed subject matter. No such example embodiment described limits any claim and any claim may cover processes or systems that differ from those described. The claims are not limited to systems or processes having all the features of any one system or process described above or to features common to multiple or all the systems or processes described above. It is possible that a system or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix (e.g., 170*a*, or 170*n*). All elements with a common base number may be referred to collectively or generically using the base number without a suffix (e.g., 170).

The systems and methods described herein may be implemented as a combination of hardware or software. In some cases, the systems and methods described herein may be implemented, at least in part, by using one or more computer programs, executing on one or more programmable devices including at least one processing element, and a data storage element (including volatile and non-volatile memory and/or storage elements). These systems may also have at least one input device (e.g., a pushbutton keyboard, mouse, a touchscreen, and the like), and at least one output device (e.g., a display screen, a printer, a wireless radio, and the like) depending on the nature of the device. Further, in some examples, one or more of the systems and methods described herein may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework or a Databricks™ analytical platform. Further, and in addition to the CPUs described herein, the distributed computing components may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g., downloads), media, digital and analog signals, and the like. The computer usable instructions may also be in various formats, including compiled and non-compiled code.

While the above description provides examples of one or more processes or systems, it will be appreciated that other processes or systems may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be revisited.

What is claimed is:

1. A data streaming system with attribute-based access control, the system comprising:
   a client apparatus comprising:
   a client memory;
   a client communication interface; and
   a client processor operatively coupled to the client memory and the client communication interface, the client processor configured for locally processing messages on the client apparatus, wherein the messages are received in a data stream provided by a data stream provider external to the client apparatus, and wherein the locally processing the messages comprises:
   the client apparatus receiving a first message via the data stream, the first message comprising a message type and a first schema version of a schema associated with the message type;
   the client apparatus processing the first message based on the first schema version to obtain a first data record including a first data item and a first data tag corresponding to the first data item;
   the client apparatus receiving a later message via the data stream, the later message comprising a second schema version of the schema associated therewith;

the client apparatus processing the later message to retrieve a second record, the second record including a second data item and a second data tag corresponding to the second data item;

with reference to the second schema version, the client apparatus determining whether an identifier associated with the client apparatus has permission to access the second data item associated with the second data tag;

after detecting that the identifier does not have permission to access data associated with the second data tag, the client apparatus masking the second data item to produce a masked data record; and the client apparatus releasing the masked data record for further processing by the client apparatus.

2. The system of claim 1, wherein, following receipt of the later message, the client processor is further configured to obtain the second schema version of the schema.

3. The system of claim 1, further comprising:

a monitoring apparatus comprising:

a monitoring apparatus memory;

a monitoring apparatus communication interface; and a monitoring apparatus processor coupled to the monitoring apparatus memory and the monitoring apparatus communication interface, the monitoring apparatus processor configured to:

receive the first message via the data stream, the first message comprising the message type and initially comprising the first schema version associated with the message type;

process the first message to determine that a schema update is required;

update the schema to generate the second schema version for use in association with the message type; and send the second schema version to the client apparatus.

4. The system of claim 3, wherein the processing of the first message by the monitoring apparatus processor comprises:

obtaining the first data record from the first message including the first data item and the first data tag associated therewith; and determining that the first schema version requires updating based on the first data item and first data tag.

5. The system of claim 4, wherein the determining comprises processing the data item using a category tagging machine learning model, which comprises a classification model.

6. The system of claim 4, wherein the determining comprises processing the data item using a category tagging machine learning model, and the category tagging machine learning model comprises a neural network that is trained to identify one or more categories for one or more respective data tags.

7. The system of claim 1, wherein the first message and the later message are encrypted, and wherein the client apparatus decrypts the first message and the later message prior to processing the first message and the later message.

8. The system of claim 1, wherein the first message and the later message are serialized, and wherein the client apparatus deserializes the first message and the later message prior to processing the first message and the later message.

9. The system of claim 1, wherein the client apparatus is a subscriber to a first topic, and the data stream is specific to the first topic.

10. The system of claim 1, wherein, after releasing the masked data, the client apparatus processor configured to further:

obtain a third schema version that replaces the second schema version, wherein the third schema version is associated with the identifier of the client apparatus and wherein the third schema version comprises an access permission associated with the second data tag;

receive a subsequent message via the data stream, which is after the later message, wherein the subsequent message is associated with the third schema version;

process the subsequent message to retrieve a third record, the third record including a third data item and the second data tag corresponding to the third data item;

with reference to the third schema version, detect the access permission associated with the second data tag; and release the third data record for further processing by the client apparatus.

11. A method for data streaming with attribute-based access control, the method executed in a computing environment comprising one or more processors and memory, the method comprising:

a client apparatus locally processing messages, wherein the messages are received in a data stream provided by a data stream provider external to the client apparatus, and wherein the locally processing the messages comprises:

the client apparatus receiving a first message via a data stream provided by a data stream provider external to the client apparatus, the first message comprising a message type and a first schema version of a schema associated with the message type;

the client apparatus processing the first message based on the first schema version to obtain a first data record including a first data item and a first data tag corresponding to the first data item;

the client apparatus receiving a later message via the data stream, the later message comprising a second schema version of the schema associated therewith;

the client apparatus processing the later message to retrieve a second record, the second record including a second data item and a second data tag corresponding to the second data item;

with reference to the second schema version, the client apparatus determining whether an identifier associated with the client apparatus has permission to access data associated with the second data tag;

after detecting that the identifier does not have permission to access data associated with the second data tag, the client apparatus masking the second data item to produce a masked data record; and the client apparatus releasing the masked data record for further processing by the client apparatus.

12. The method of claim 11, further comprising: following receipt of the later message, the client apparatus retrieving the second schema version of the schema.

13. The method of claim 11, further comprising:

a monitoring apparatus receiving the first message via the data stream, the first message comprising the message type and initially comprising the first schema version associated with the message type;

the monitoring apparatus processing the first message to determine that a schema update is required;

the monitoring apparatus updating the schema to generate the second schema version for use in association with the message type; and the monitoring apparatus sending the second schema version to the client apparatus.

14. The method of claim 13, wherein the processing of the first message by the monitoring apparatus comprises:

obtaining the first data record from the first message including the first data item and the first data tag associated therewith; and determining that the first schema version requires updating based on the first data item and first data tag.

15. The method of claim 14, wherein the determining comprises processing the data item using a category tagging machine learning model, which comprises a classification model.

16. The method of claim 14, wherein the determining comprises processing the data item using a category tagging machine learning model, and the category tagging machine learning model comprises a neural network that is trained to identify one or more categories for one or more respective data tags.

17. The method of claim 11, wherein the first message and the later message are encrypted, and wherein the client apparatus decrypts the first message and the later message prior to processing the first message and the later message.

18. The method of claim 11, wherein the first message and the later message are serialized, and wherein the client apparatus deserializes the first message and the later message prior to processing the first message and the later message.

19. The method of claim 11, wherein, after releasing the masked data, the method further comprises:

the client apparatus receiving a third schema version that replaces the second schema version, wherein the third schema version is associated with the identifier of the client apparatus and wherein the third schema version comprises an access permission associated with the second data tag;

the client apparatus receiving a subsequent message via the data stream, which is after the later message, wherein the subsequent message is associated with the third schema version;

the client apparatus processing the subsequent message to retrieve a third record, the third record including a third data item and the second data tag corresponding to the third data item;

with reference to the third schema version, the client apparatus detecting the access permission associated with the second data tag; and the client apparatus releasing the third data record for further processing by the client apparatus.

20. A non-transitory computer readable medium storing computer executable instructions which, when executed by at least one computer processor of a client apparatus, cause the at least one computer processor to carry out a method for data streaming with attribute-based access control, the method comprising:

the client apparatus locally processing messages, wherein the messages are received in a data stream provided by a data stream provider external to the client apparatus, and wherein the locally processing the messages comprises:

the client apparatus receiving a first message via a data stream provided by a data stream provider, the first message comprising a message type and a first schema version of a schema associated with the message type;

the client apparatus processing the first message based on the first schema version to obtain a first data record including a first data item and a first data tag corresponding to the first data item;

the client apparatus receiving a later message via the data stream, the later message comprising a second schema version of the schema associated therewith;

the client apparatus processing the later message to retrieve a second record, the second record including a second data item and a second data tag corresponding to the second data item;

with reference to the second schema version, the client apparatus determining whether an identifier associated with the client apparatus has permission to access data associated with the second data tag;

after detecting that the identifier does not have permission to access data associated with the second data tag, the client apparatus masking the second data item to produce a masked data record; and the client apparatus releasing the masked data record for further processing by the client apparatus.

* * * * *